Sept. 14, 1948.  S. J. WOODS  2,449,266
FOOT PROPELLED VEHICLE

Filed March 25, 1947  3 Sheets-Sheet 1

INVENTOR.
Samuel J. Woods,
BY George D. Richards
Attorney

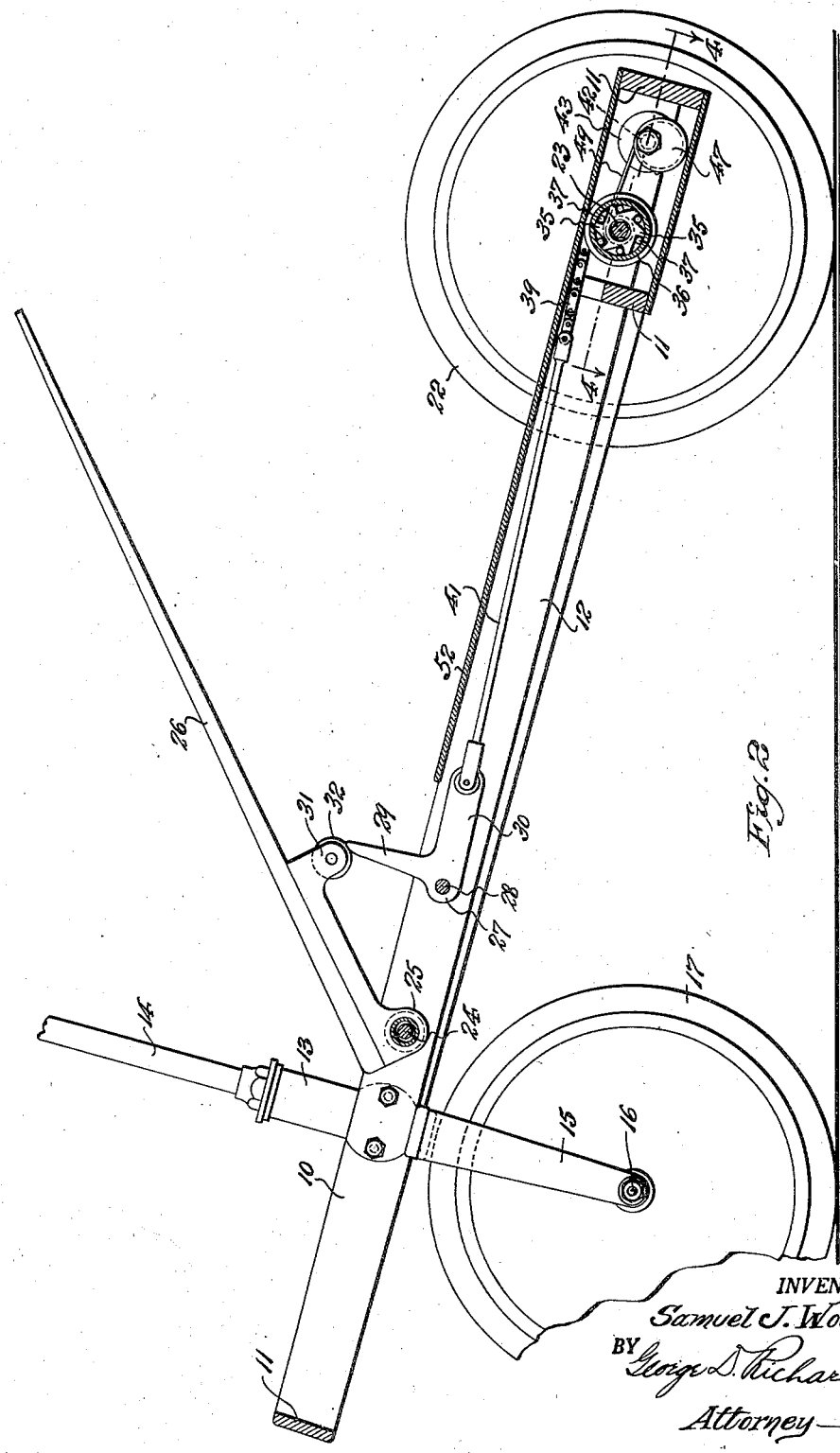

Sept. 14, 1948.     S. J. WOODS     2,449,266
FOOT PROPELLED VEHICLE
Filed March 25, 1947     3 Sheets-Sheet 3
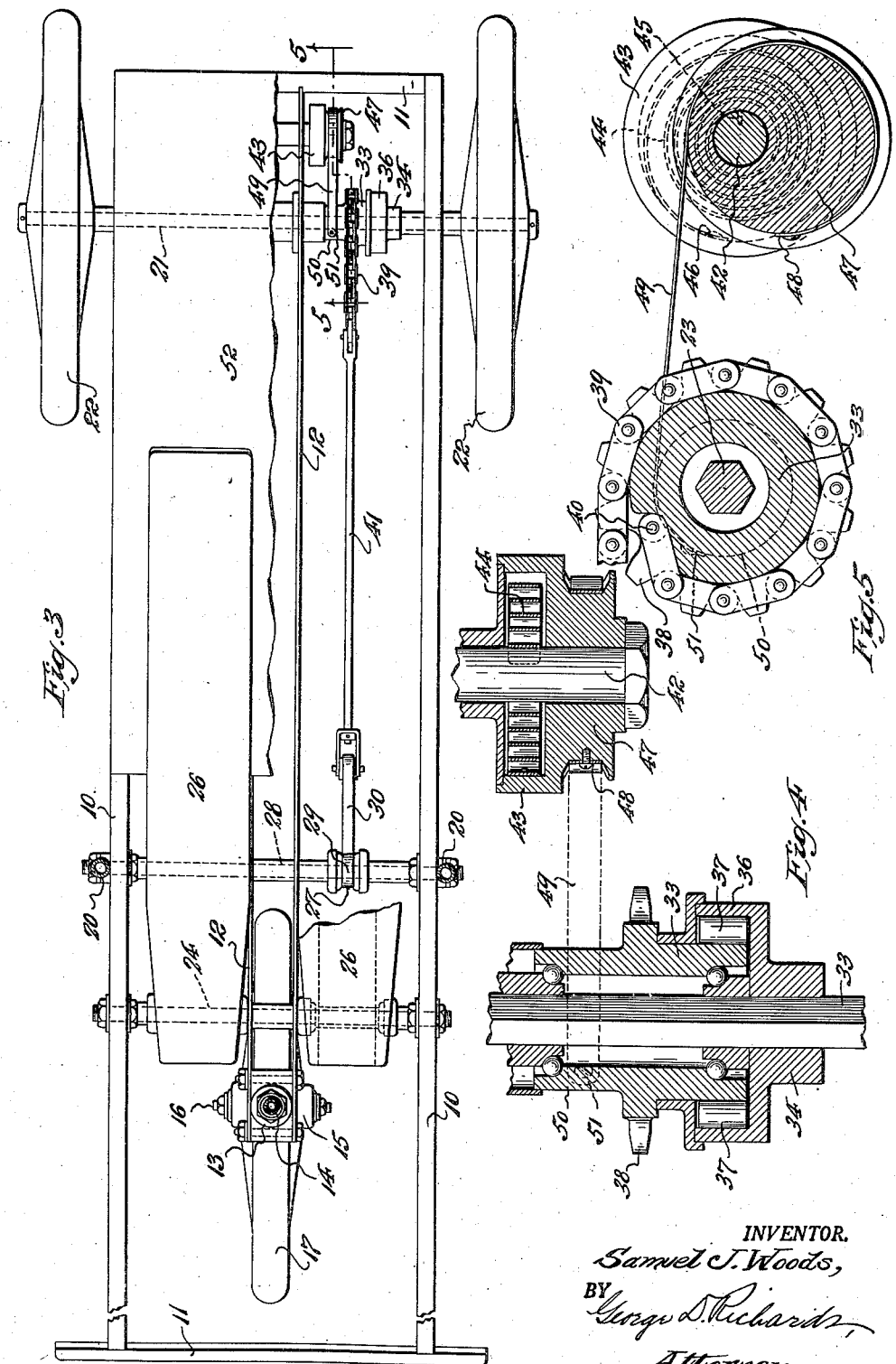
INVENTOR.
Samuel J. Woods,
BY
George D. Richards,
Attorney Patented Sept. 14, 1948

2,449,266

UNITED STATES PATENT OFFICE 2,449,266

FOOT PROPELLED VEHICLE

Samuel J. Woods, Newport, R. I.

Application March 25, 1947, Serial No. 736,991

7 Claims. (Cl. 280—251)

This invention relates to a novel construction of propellable wheeled vehicle of the foot operated type; and the invention has reference, more particularly, to a child's scooter form of vehicle which is equipped with pivoted foot treadles and cooperative means for transmitting the driving power, developed by actuation of said treadles, to the rear wheels of the vehicle.

The invention has for an object to provide a novel foot operated wheeled vehicle wherein pivoted foot treadles are provided to cooperate respectively with bell-crank means adapted to apply driving torque to the rear wheel axle shaft of the vehicle through clutch devices cooperative with said axle shaft, so that the rear wheels of the vehicle are both simultaneously and constantly propelled by the alternated action of said treadles.

The invention has for another object to provide a foot power transmission mechanism for the driving wheels of the vehicle, the operation of which is such that initial movement of the operative strokes of foot treadles, by actuation of the bell-crank means, produces maximum power, while end phases of said treadle strokes produces maximum speed.

Other objects of this invention, not at this time more particularly enumerated, will be understood from the following detailed description of the same.

An illustrative embodiment of the invention is shown in the accompanying drawings, in which—

Figure 1:
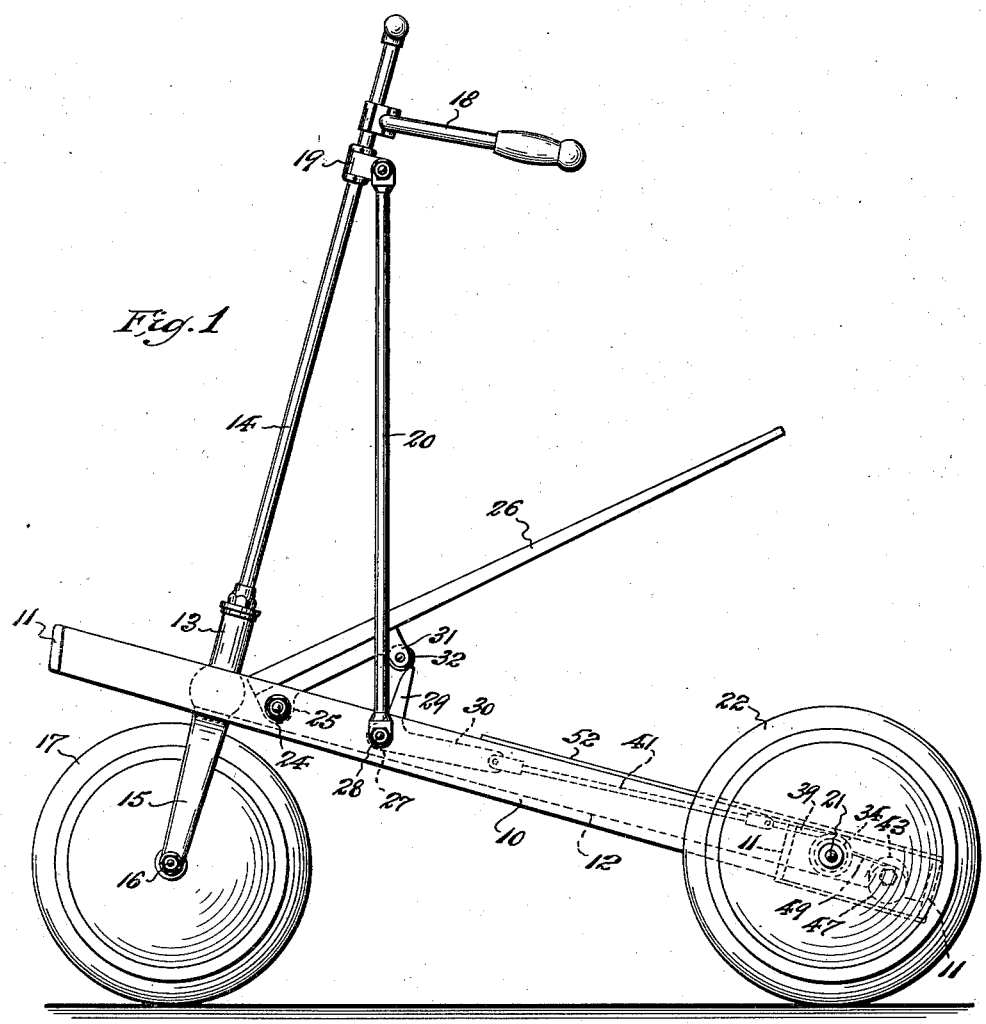
Figure 6:
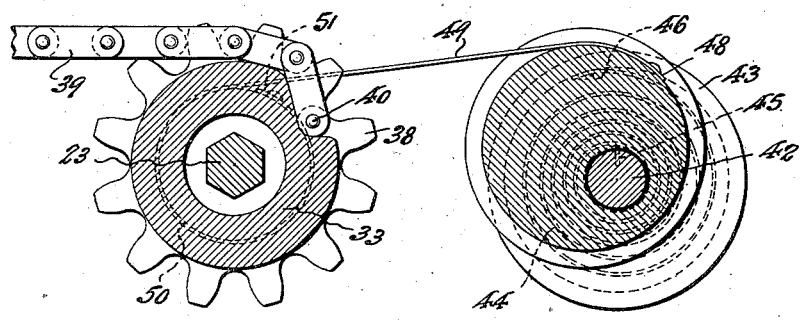

Fig. 1 is a side elevational view of a foot operated wheeled vehicle according to the invention; Fig. 2 is a longitudinal sectional view of the vehicle drawn on an enlarged scale, but with parts broken away; Fig. 3 is a plan view of the vehicle with parts broken away; Fig. 4 is a fragmentary horizontal section, taken on line 4—4 in Fig. 2, but drawn on an enlarged scale; Fig. 5 is a sectional view, taken on line 5—5 in Fig. 3, but drawn on an enlarged scale, and showing an initial position of the power transmission means; and Fig. 6 is a view similar to that of Fig. 5, but showing said power transmission means at the end of an operative movement thereof.

Similar characters of reference are employed in the hereinabove described views, to indicate corresponding parts.

Referring to the drawings, the vehicle of this invention comprises a frame structure formed by laterally spaced, longitudinally extending side members 10, which are connected at their front and rear end portions by transverse members 11. Centrally disposed intermediate the side members 10 of the frame structure are laterally spaced, longitudinally extending supplementary frame bars 12.

Suitably secured between the frame bars 12 adjacent the forward end of the frame structure is a bearing column 13, in which is journaled a steering post 14. Affixed to the lower end of the steering post 14 is a fork 15 between the arms of which is supported an axle 16 upon which the front wheel 17 of the vehicle is rotatably mounted. The steering post 14 extends upwardly from the frame structure, and suitably secured to the upper end portion thereof are handle bars 18 or equivalent means for rotating the steering post, whereby to turn the front wheel 17 for controlling the direction of movement of the vehicle. Said steering post 14 is further supported by an upper bearing member 19, which is in turn supported by stay rods 20 which respectively extend between the side members 10 of the frame structure and said upper bearing member 19.

Mounted across the rearward end portion of the frame structure is an axle shaft 21 on the respective ends of which are mounted the rear wheels 22 of the vehicle, preferably by means of one-way clutch devices (not shown), which wheels serve as the driving wheels of the vehicle. At least the intermediate portion 23 of said axle shaft is preferably of polygonal cross sectional shape, such, e. g., as of the hexagonal shape shown.

The propulsion of the vehicle is effected by means adapted to rotate the axle shaft 21, and the rear wheels 22 affixed thereto, from pivoted foot treadle members which are adapted to be operated by the feet of the rider of the vehicle. To this end, a transverse fulcrum shaft 24 is supported by the frame structure rearwardly adjacent to the steering post 14, and pivotally mounted on said fulcrum shaft 24, by the hinging knuckle members 25 thereof, are a pair of laterally spaced, rearwardly extending and normally upwardly inclined foot treadles 26. The power transmission means, which is adapted to be actuated by said foot treadles 26, comprises a bell-crank member 27 located beneath each foot treadle 26. Each said bell-crank member is pivotally fulcrumed upon a second transverse fulcrum shaft 28, which is supported by the frame structure in suitable location beneath and adjacent to the pivoted ends of said foot treadles. Each bell-crank member 27 comprises a cam arm 29, which extends upwardly toward the underside of the foot treadle cooperative therewith, and a rearwardly extending draft arm 30. The foot treadles are each provided, at their under sides, with thrust means 31 having anti-friction rollers 32 to bear upon the cam arms 29 of the respective bell-crank members with which said treadles cooperate.

The bell-crank members 27 are respectively adapted to cooperate with clutch mechanisms arranged to be respectively actuated thereby. Each clutch mechanism comprises a driver clutch member 33 which is mounted on the axle shaft 21 to rotate about the axis thereof, and which drives a driven clutch member 34 which is affixed to said axle shaft, preferably by the axial opening thereof which conforms to the hexagonal portion 23 of the latter. The driver and driven clutch members may be of any suitable type or design, but preferably, as shown, the driver clutch member comprises a star-wheel, having wedge teeth 35, which rotates within the cylindrical drum section 36 of the driven clutch member 34. Disposed intermediate said wedge teeth 35 and drum section 36 are clutch rollers 37. As will be understood, when the driver clutch member 33 is rotated in driving direction, which is counterclockwise as viewed in Fig. 2, the wedge teeth 35 will force the clutch rollers 37 into gripping relation to the drum section 36 of the driven clutch member 34, thus imparting the motion of the driver clutch member 33 to the latter and through it to the axle shaft and rear wheels of the vehicle. When the driver clutch member rotates in the opposite or clockwise direction, the wedge teeth 35 relax clutching pressure upon the clutch rollers 37, so that the latter disengage the drum section 36 of the driven clutch member 34, thereby allowing free or coasting movement thereof. Unitary with each driver clutch member 33 is a clutch driving sprocket wheel 38 with and around which is engaged a pull chain section 39 having an end 40 thereof suitably anchored or affixed to the body of said sprocket wheel. The outer ends of the pull chain sections 39 of the respective clutch mechanisms extend forwardly toward the draft arms 30 of the respective bell-crank members 27, being connected to the free ends of the latter, preferably by a link or connecting rod 41 as shown.

The operative movement imparted to the clutch driving sprockets 38 by the bell-crank members 27 as actuated by the foot treadles 26 is in counter-clockwise direction. Spring actuated means is provided for cooperation with each clutch mechanism to effect reverse or recovery movements of the clutch driving sprockets, bell-crank members 27 and treadles 26. Each said spring actuated means comprises a transverse stub shaft 42 which is affixed to the frame structure behind the axle shaft 21 and its driving clutch mechanisms. Rotatably mounted on said stub shaft 42 is a chambered spring drum 43 within which is housed a spiral spring 44. The inner end of said spring is suitably anchored to the stub shaft 42 at 45, and its outer end to the spring drum wall at 46. Unitary with said spring drum, so as to rotate therewith, but disposed eccentric to the axis of said drum in downwardly offset relation to the normal initial position of the drum wherein the contained spring 44 is relaxed (see Fig. 5), is a winch barrel 47. Affixed by one end 48 to the periphery of said winch barrel, so as to be wound on the same, when it is disposed in its normal initial position, is a preferably metallic, flexible pull strap 49 or equivalent flexible pull means. Said pull strap 49 extends to the adjacent clutch mechanism, to the hub 50 of the driver clutch member 33. The outer end 51 of said pull strap is suitably anchored to the periphery of said hub 50, subject to winding about the same when the driver clutch member is rotated in axle shaft driving direction.

The rear end part of the frame structure is provided with a platform 52 extending over the top thereof.

In the use and operation of the vehicle according to this invention, the rider stands upon the foot treadles 26, while using the handle bars 18 both to support the body and to control the direction of vehicle movement. By alternately bearing his weight upon the treadles 26 coupled with treading motion of the legs, said treadles are caused to alternately descend and rise. As a treadle descends, its thrust means is moved down against the cam arm 29 of the bell-crank member 27 with which said treadle cooperates. The down thrust of the treadle as thus transmitted to the bell-crank causes the same to turn about its fulcrum shaft 28 in clockwise direction, thus swinging down the draft arm 30. The down swinging movement of the bell-crank draft arm exerts a forward draft or pull upon the link 41 and pull chain 39 connected therewith, thus causing said pull chain to rotate the sprocket 38 of the clutch mechanism which is served thereby. Such rotation of the sprocket is transmitted to the driver clutch member 33, so that its star wheel is rotated in corresponding direction whereby to cause the wedge teeth 35 to force the clutch rollers 37 into gripping relation to the drum section 36 of the driven clutch member 34. When thus driven, the motion of said clutch member 34 is transmitted to the axle shaft 23—21, and, through the latter, to both of the rear wheels 22 of the vehicle which are fast on said axle shaft, so that traction of said rear wheels forwardly propels the vehicle.

Due to alternate actuation of the treadles, while one clutch mechanism and treadle actuated power transmission means therefor is operating, the other clutch mechanism and its treadle actuated power transmission means is recovering from an operating phase under the pull of its associated spring actuated retracting means. As a clutch mechanism rotates in its power transmitting phase, the pull strap of its associated spring actuated retracting means will wind about the hub 50 of the driver clutch member 33, thus producing a counter-clockwise rotation of the spring drum 43 operative to tighten the spiral spring 44, whereby to bring the latter into a condition of stored tension, ready for a subsequent retracting action. Due to the eccentric relation of the winch barrel 47 relative to the spring drum 43, the spring winding leverage exerted by said winch barrel is at a minimum at the start of the spring winding operation, but said leverage progressively lengthens and its power increases substantially proportionally to the increasing tensional resistance of the spring to winding action. As a consequence of this, instead of necessity for exerting increasing pressure of the foot upon the descending treadle, in order to overcome the increasing resistance of the winding spring, with attendant loss of energy delivered through the clutch mechanism to the driving wheels of the vehicle, the pressure required to be exerted upon the treadle to overcome spring resistance will be substantially equalized throughout the amplitude of the operative stroke of the treadle.

Due to the cooperative functioning of the foot treadles and bell-crank members, the power transmission effect thereof as applied to the axle shaft and driving wheels of the vehicle is adapted to apply variable torque to the latter with variable power and speed production effect. Such desirable results are due to the fact that, at the start of the operative stroke of a treadle, the thrust of the latter upon the cam arm 29 of a bell-crank member is applied adjacent the outer end thereof, the point of maximum leverage effect, while the draft arm 30 of the bell-crank member is in line with the pull link and chain connection thereof with a clutch mechanism. By reason of the initial maximum leverage effect thus occurring at the beginning of the operative stroke of a treadle, torque of maximum power is transmitted to the axle shaft and vehicle driving wheels by the starting movement of said treadle. As a treadle descends, however, the thrust point of engagement thereof with the cam arm 29 moves downward along the latter, while at the same time the sweep of the draft arm 30 increases; and since momentum of the vehicle has at such time been initiated, movement of the bell-crank member will accelerate with like accelerating effect upon the clutch mechanism, axle shaft and vehicle driving wheels. It will therefore be understood that the treadles may be operated to obtain a multi-speed effect, that is maximum power at relatively slow speed, or high speed at minimum power expenditure. To illustrate the advantage of this mode of operation, if the vehicle is propelled along a substantially level surface, once motion is initiated, the actuation of the treadles may be limited to lower parts or phases of their operative strokes with relatively high speed propulsion effect. On the other hand, if the vehicle is propelled along an upgrade surface, the actuation of the treadles may be limited to the upper parts or phases of their operative strokes with maximum propulsive power effect at relatively slow speed.

I am aware that changes could be made in the above described constructions without departing from the scope of this invention as defined in the following claims. It is therefore intended that all matter contained in the foregoing description or shown in the accompanying drawings shall be interpreted as illustrative and not in a limiting sense.

I claim:

1. A foot propelled vehicle having a frame structure, a steering wheel and control means therefor mounted at the front part of said frame structure, a rotatable axle shaft mounted at the rear part of said frame structure and driving wheels mounted on said axle shaft, a pair of treadles pivotally mounted on the frame structure, bell-crank members pivotally supported in connection with the frame structure respectively beneath said treadles, each bell-crank member comprising an upwardly extending cam arm engageable by a treadle to receive actuating down thrust thereof and a rearwardly extending draft arm, clutch members each comprising a driven element fixed on the axle shaft and an oscillatable driver element cooperative with said driven element, clutch operating pull connections respectively interconnecting said driver elements with the draft arms of the respective bell-crank members, and a spring means operative in connection with each said driver element to effect recovery movement thereof and of the bell-crank member and treadle cooperative therewith.

2. A foot propelled vehicle having a frame structure, a steering wheel and control means therefor mounted at the front part of said frame structure, a rotatable axle shaft mounted at the rear part of said frame structure and driving wheels mounted on said axle shaft, a pair of treadles pivotally mounted on the frame structure, bell-crank members pivotally supported in connection with the frame structure respectively beneath said treadles, each bell-crank member comprising an upwardly extending cam arm engageable by a treadle to receive actuating down thrust thereof and a rearwardly extending draft arm, roller clutch members, each clutch member comprising a driven element fixed on the axle shaft and an oscillatable driver element rotatable about the axle shaft, pull connections respectively interconnecting the driver elements of the clutch members with the draft arms of the respective bell-crank members, and a spring means operative in connection with the driver element of each said clutch member to effect recovery movement thereof and of said bell-crank member and treadle cooperative therewith.

3. A foot propelled vehicle as defined in claim 1 wherein the recovery spring means comprises a spring drum cooperative with each clutch member, means for rotatably mounting each drum adjacent the clutch member served thereby, a spiral spring in each drum having its inner end anchored to the drum mounting means and its outer end to the drum, a winch barrel unitary with each drum but eccentric to the axis of rotation thereof, and a flexible connection interconnected between each winch barrel and the driver element of a corresponding clutch member.

4. A foot propelled vehicle as defined in claim 2 wherein the recovery spring means comprises a spring drum cooperative with each clutch member, means for rotatably mounting each drum adjacent the clutch member served thereby, a spiral spring in each drum having its inner end anchored to the drum mounting means and its outer end to the drum, a winch barrel unitary with each drum but eccentric to the axis of rotation thereof, and a flexible connection interconnected between each winch barrel and the driver element of the corresponding clutch member.

5. A foot propelled vehicle having a frame structure, a steering wheel and control means therefor mounted at the front part of said frame structure, a rotatable axle shaft mounted at the rear part of said frame structure and driving wheels mounted on said axle shaft, a pair of treadles pivotally mounted on the frame structure, bell-crank members pivotally supported in connection with the frame structure respectively beneath said treadles, each bell-crank member comprising an upwardly extending cam arm and a rearwardly extending draft arm, each treadle having a thrust means including an anti-friction roller dependent from the underside thereof adapted to operatively engage the cam arm of the underlying bell-crank member, clutch members each comprising a driven element fixed on the axle shaft and an oscillatable driver element cooperative with said driven element, clutch operating pull connections respectively interconnecting said driver elements with the draft arms of the respective bell-crank members, and a spring means operative in connection with the driver element of each clutch member to effect recovery movement thereof and of the bell-crank member and treadle cooperative therewith.

6. A foot propelled vehicle having a frame structure, a steering wheel and control means therefor mounted at the front part of said frame structure, a rotatable axle shaft mounted on the rear part of said frame structure and driving wheels mounted on said axle shaft, a pair of treadles pivotally mounted on the frame structure, bell-crank members pivotally supported in connection with the frame structure respectively beneath said treadles, each bell-crank member comprising an upwardly extending cam arm and a rearwardly extending draft arm, each treadle having a thrust means including an antifriction roller dependent from the underside thereof adapted to operatively engage the cam arm of the underlying bell-crank member, roller clutch members, each clutch member comprising a driven element fixed on the axle shaft and an oscillatable driver element rotatable about the axle shaft, each oscillatable driver element having a hub portion and a sprocket unitary with said hub portion, a pull chain affixed to each hub portion to normally extend over said sprocket, means to couple said pull chains respectively in connection with the draft arms of the respective bell-crank members, and a spring means operative in connection with the hub portion of the driver element of each clutch member to effect recovery movement of said driver element and the bell-crank member and treadle cooperative therewith.

7. A foot propelled vehicle as defined in claim 6 wherein each recovery spring means comprises a spring drum, means for rotatably mounting said drum adjacent to the clutch member served thereby, a spiral spring in said drum having its inner end anchored to the drum mounting means and its outer end to the drum, a winch barrel unitary with said drum but eccentric to the axis of rotation thereof, and a flexible pull strap secured by one end to said winch barrel in normal wound relation thereto and by its other end to the hub portion of the driver element of the corresponding clutch member.

SAMUEL J. WOODS.